(12) United States Patent
Dssouli et al.

(10) Patent No.: US 7,697,490 B2
(45) Date of Patent: *Apr. 13, 2010

(54) CLUSTER OF TERMINALS AND AD-HOC NETWORK FOR CLUSTER-BASED MULTI-PARTY CONFERENCING

(75) Inventors: Rachida Dssouli, NDG (CA); Chunyan Fu, Montreal (CA); Roch Glitho, Montreal (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1532 days.

This patent is subject to a terminal disclaimer.

(21) Appl. No.: 10/999,944

(22) Filed: Dec. 1, 2004

(65) Prior Publication Data

US 2006/0114843 A1 Jun. 1, 2006

(51) Int. Cl.
*H04Q 7/24* (2006.01)
(52) U.S. Cl. ..................... 370/338; 370/254
(58) Field of Classification Search ........... 370/255, 370/260–269, 338, 352, 254; 379/201.01–207.01
See application file for complete search history.

(56) References Cited

U.S. PATENT DOCUMENTS

| | | | |
|---|---|---|---|
| 6,404,873 B1 * | 6/2002 | Beyda et al. | 379/202.01 |
| 6,636,499 B1 | 10/2003 | Dowling | 370/338 |
| 6,771,759 B2 * | 8/2004 | Mark et al. | 379/202.01 |
| 6,834,192 B1 * | 12/2004 | Watanabe et al. | 455/444 |
| 6,876,643 B1 * | 4/2005 | Aggarwal et al. | 370/338 |
| 6,975,613 B1 * | 12/2005 | Johansson | 370/338 |
| 7,295,960 B2 * | 11/2007 | Rappaport et al. | 703/13 |
| 7,460,508 B2 * | 12/2008 | Dssouli et al. | 370/338 |
| 2001/0029166 A1 * | 10/2001 | Rune et al. | 455/41 |
| 2002/0018448 A1 * | 2/2002 | Amis et al. | 370/255 |
| 2002/0035699 A1 * | 3/2002 | Crosbie | 713/201 |
| 2002/0042693 A1 | 4/2002 | Kampe et al. | 702/186 |
| 2002/0065058 A1 * | 5/2002 | Gatherer et al. | 455/272 |
| 2002/0167915 A1 * | 11/2002 | Mills et al. | 370/260 |
| 2003/0026214 A1 * | 2/2003 | Iveland et al. | 370/260 |
| 2003/0041138 A1 | 2/2003 | Kampe et al. | 709/223 |
| 2003/0063573 A1 * | 4/2003 | Vandermersch | 370/260 |
| 2003/0112797 A1 * | 6/2003 | Li et al. | 370/360 |
| 2003/0204509 A1 | 10/2003 | Dinker et al. | 707/100 |

(Continued)

*Primary Examiner*—Creighton Smith
(74) *Attorney, Agent, or Firm*—Ericsson Canada Inc.; Alex Nicolaescu

(57) ABSTRACT

A cluster of terminals, and an ad-hoc network of two or more such clusters, for carrying a multi-party, cluster-based, conference, wherein each cluster includes a super member comprising a super user agent, and one or more members including a user agent. Communications sessions are established between the super member of each cluster and each member terminals of the same cluster, and between the super members of each one of the first and second clusters. The user agent comprises identity of the super member, a conference identity, cluster parameters including a split value (Sv) indicative of a maximum number of terminals that may be part of the cluster, wherein when Sv is reached during the conference the cluster is split, and a merge value (Mv) indicative of a minimum number of terminals that may be part of the cluster, wherein when Mv is reached the cluster is merged with another cluster. The super user agent comprises a cluster member list, the conference identity, a cluster neighbour list, the one or more terminals also participating to the same conference, and cluster parameters.

14 Claims, 8 Drawing Sheets

U.S. PATENT DOCUMENTS

| | | | |
|---|---|---|---|
| 2003/0212777 A1 | 11/2003 | Kandefer et al. | 709/223 |
| 2006/0040692 A1* | 2/2006 | Anttila et al. | 455/519 |
| 2006/0062368 A1* | 3/2006 | Saha et al. | 379/202.01 |
| 2006/0089119 A1* | 4/2006 | Lipasti et al. | 455/410 |
| 2006/0114846 A1* | 6/2006 | Dssouli et al. | 370/261 |

* cited by examiner

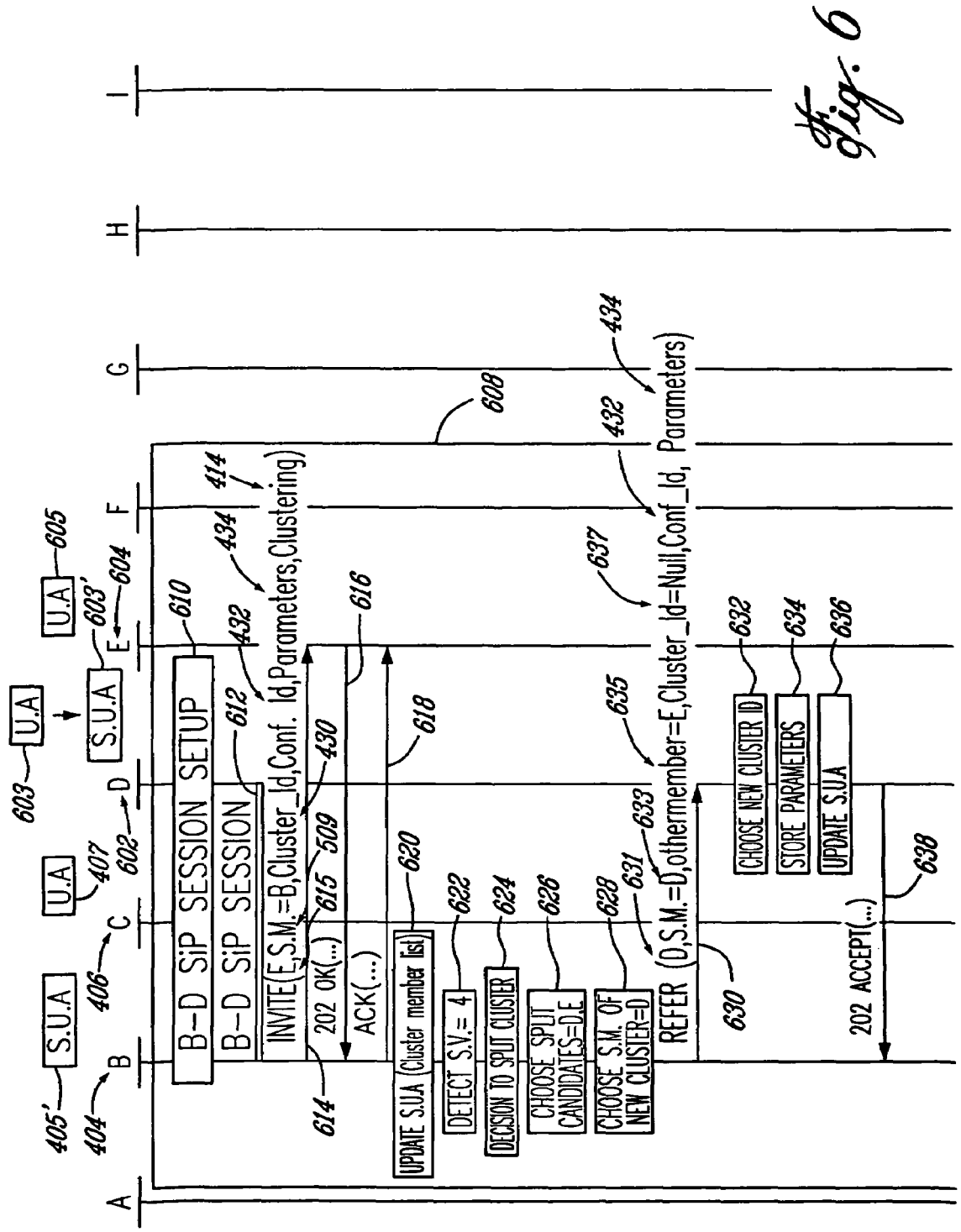

CLUSTER OF TERMINALS AND AD-HOC NETWORK FOR CLUSTER-BASED MULTI-PARTY CONFERENCING

BACKGROUND OF THE INVENTION

1. Field of the Invention

The present invention relates to a method and system for communicating in ad-hoc networks.

2. Description of the Related Art

Multiparty sessions are the basis of several important applications. Examples of such applications are audio and video conferencing, distance learning and gaming. So far, little attention has been devoted to these applications in peer-to-peer settings. The same holds for ad-hoc networks. Ad-hoc networks usually rely on peer-to-peer paradigm, especially when the terminals composing these networks are mobile terminals. Terminals' mobility in multiparty sessions that take place in peer-to-peer ad-hoc networks engenders a critical issue related to signaling.

Ad-hoc networks comprise nodes that communicate without a pre-existing network infrastructure. They form spontaneously without the need of a dedicated infrastructure or a central controller. Such a peer-to-peer system infers that each node, or user, in the network can act as a data endpoint or intermediate repeater.

Peer-to-Peer (P2P) is a paradigm to structure distributed applications, in such a way that individual nodes have symmetric roles. Peer-to-peer networks do not have to be ad-hoc and most existing peer-to-peer networks are actually not. However, ad-hoc networks usually rely on peer-to-peer communications, especially when they are mobile. This is due to the lack of pre-existing and non-transient infrastructure such as centralized servers.

An ad-hoc conference typically begins with two participants, and additional participants join when, for example, invited by any of the participants already in the conference. This model fits quite well in ad-hoc peer-to-peer to networks settings. It is the basis of numerous applications including public debates and gaming.

Significant work has been done on signaling for multiparty sessions in traditional networks, such as for example with the development of the Session Initiation Protocol ("SIP: Session Initiation Protocol", by J. Rosenberg et al., Request for Comments RFC 3261, June 2002.), all of which is herein included by reference), the International Telecommunication Union-Telecommunication (ITU-T) H.323 protocol (H.323 series, ITU-T recommendations, Geneva 2003, which is also herein included by reference in its entirety), and ICEBERG (by Helen J. Wang, et al., "Iceberg: An Internet Core Network Architecture for Integrated Communications", IEEE Personal Communications, August 2000, which is also herein included by reference). The same applies to the low layers issues of ad-hoc networks (e.g. routing), and also to the non-multiparty session applications in peer-to-peer networks (e.g. Gnutella, Freenet). However, no or little work has been done so far on signaling in peer-to-peer ad hoc networks.

Signaling in peer-to-peer ad-hoc networks is quite challenging. Participants to such a network may join or leave at any time. The information also needs to be propagated in a distributed manner since there is no centralized server in the network. Resources need to be used in an optimal manner due to the peer-to-peer structure. Peers with limited resources need to rely on the resources of the other peers.

None of the existing signaling system meets these requirements. For example, H.323 comprises a centralized entity, i.e. the H.323 Multipoint Control Unit (MCU), and has only a medium scalability level. It does not have a dynamic sessions management capability, and lacks an optimal usage of recourses. The full mesh version of SIP (by Mark/Kelley, "Distributed Multipoint Conferences using SIP", IETF Internet Draft, Mar. 8, 2000, also included by reference herein) does not comprise a centralized entity, but has an even lower scalability level. It also has a low level of dynamic sessions management capability, and lacks an optimal usage of recourses (note: SIP does defined centralized servers but it has been discussed as full mesh manner in the reference document above). Finally, Iceberg also comprises a centralized entity. Although it has a high scalability level and a dynamic sessions management capability, it lacks an optimal usage of recourses.

Although there is no prior art solution as the one proposed hereinafter for solving the above-mentioned deficiencies, the US patent application US2002/0042693 by Kampe at al. (hereinafter called Kampe) bears some relation with the field of the present invention. Kampe teaches a system and methods within a high availability network for monitoring and managing cluster membership. A cluster membership monitor provides the ability to maintain a list of current cluster members, monitor status of each node of the cluster, stay apprised of each node's viability, elect a master node for the cluster when necessary, and coordinate cluster reformation as members join and leave the cluster. However, Kampe's system comprises a centralized node, i.e. the cluster membership monitor, and therefore it's principles are not applicable to ad-hoc networks.

The US patent application US 2003/0204509 by Dinker at al. (hereinafter called Dinker) also bears some relation with the field of the present invention. Dinker teaches a distributed system providing for separate management of dynamic cluster membership and of distributed data. Dinker's nodes of the distributed system include a state manager and a topology manager. The state manager handles data access from the cluster, while the topology manager handles changes to the dynamic cluster topology, such as when new nodes join or exit the cluster. However, the teaching of Dinker is limited to a system able to form one cluster at a time.

Accordingly, it should be readily appreciated that in order to overcome the deficiencies and shortcomings of the existing solutions, it would be advantageous to have a method and system for effectively setting up ad-hoc networks using the concept of clustering. The present invention provides such a method and system.

SUMMARY OF THE INVENTION

A cluster of terminals, and an ad-hoc network of two or more such clusters, for carrying a multi-party, cluster-based, conference, wherein each cluster includes a super member comprising a super user agent, and one or more members including a user agent. Communications sessions are established between the super member terminal of each cluster and each one of the one or more member terminals of the same cluster, and between the super members of each one of the first and second clusters. The user agent comprises identity of the super member terminal of the cluster, a conference identity identifying the cluster-based conference, cluster parameters including a split value (Sv) indicative of a maximum number of terminals that may be part of the cluster, wherein when Sv is reached during the conference the cluster is split, and a merge value (Mv) indicative of a minimum number of terminals that may be part of the cluster, wherein when Mv is reached the cluster is merged with another cluster. The super user agent comprises a cluster member list of terminals of the cluster, the conference identity, a cluster neighbour list identifying any other one or more neighbour terminals including a super user agent, the one or more terminals also participating to the same conference, and the cluster parameters.

In one aspect, the present invention is a cluster of terminals for carrying a cluster-based conference, the cluster comprising:

a super member terminal equipped with a super user agent which includes:
        a cluster member list including identities of terminals that are members of the cluster;
        a conference identity that identifies the conference to which the super member terminal participates;
        a cluster neighbour list that identifies any other one or more other super member terminals of other clusters which also participate to the conference;
        cluster parameters associated to the cluster including a split value Sv indicative of a maximum number of terminals that may be part of the cluster, wherein when the split value Sv is reached during the conference, the cluster is split, and a merge value Mv indicative of a minimum number of terminals that may be part of the cluster, wherein when the merge value Mv is reached during the conference, the cluster is merged with another cluster; and
    one or more member terminals;
    wherein for carrying on the cluster-based conference, communications sessions are established i) between the super member terminal and each one of the one or more member terminals, and ii) between the super member and each any other one or more other super member terminals.

In another aspect, the present invention is an ad-hoc network of terminals comprising:

a first cluster of terminals involved in a multi-party conference;
    a second cluster of terminals involved in the multi-party conference;
    wherein each one of the first and second cluster comprises:
    a super member terminal equipped with a super user agent which includes:
        a cluster member list including identities of terminals that are members of the cluster;
        a conference identity that identifies the conference to which the super member terminal participates;
        a cluster neighbour list that identifies any other one or more other super member terminals of other clusters which also participate to the conference;
        cluster parameters associated to the cluster including a split value Sv indicative of a maximum number of terminals that may be part of the cluster, wherein when the split value Sv is reached during the conference, the cluster is split, and a merge value Mv indicative of a minimum number of terminals that may be part of the cluster, wherein when the merge value Mv is reached during the conference, the cluster is merged with another cluster; and
    one or more member terminals;
    wherein for carrying on the cluster-based conference, communications sessions are established i) between the super member terminal of each cluster and each one of the one or more member terminals of the same cluster, and ii) between the super members of each one of the first and second clusters.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
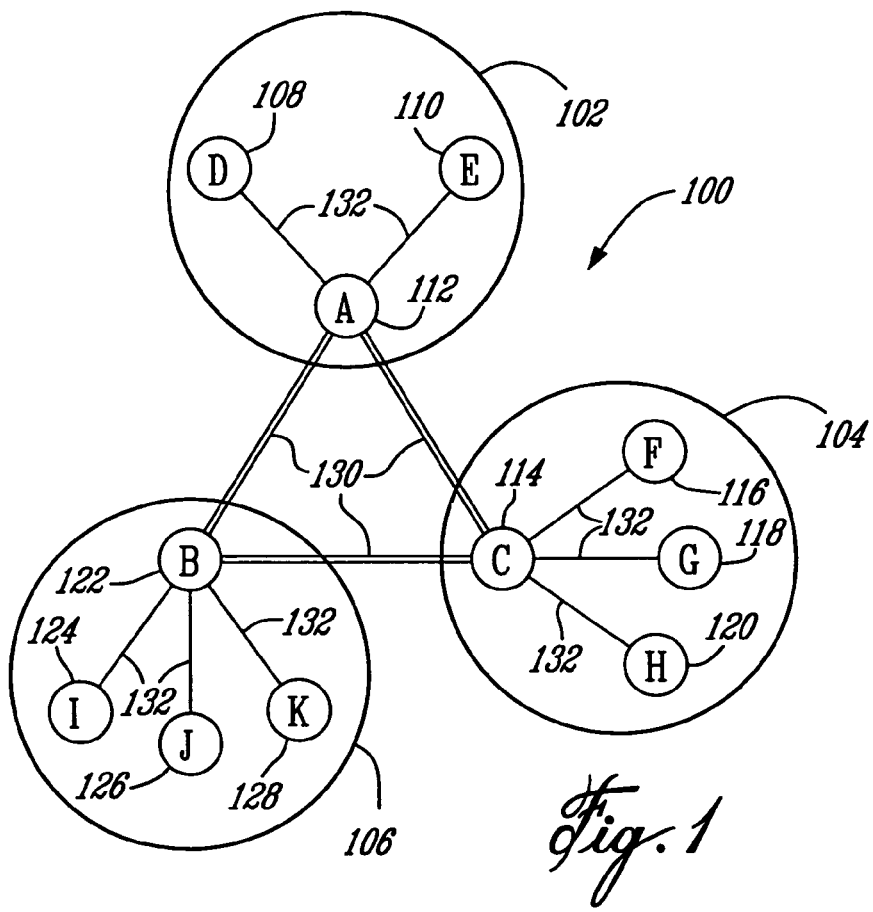
FIG. 1 is an exemplary high-level representation of an ad-hoc network formed to handle a multi-party conference using terminals clusters according to the preferred embodiment of the present invention.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

According to the present invention, there are provided methods, system, and user agents for efficiently establishing ad-hoc networks capable of carrying on multiparty conferences among a plurality of terminals.

In peer-to-peer ad hoc networks, there should be no centralized signaling entity, since there is no centralized entity in ad hoc peer-to-peer setting. Signaling sessions should be maintained dynamically because participants may join or leave at anytime. This implies that information is properly propagated to all nodes (including nodes that join at the same time), although there is no centralized server. Furthermore, the system should be scalable because a multiparty session starting with a couple of participants may grow to thousands of participants depending on the application. The system should be light-weigh because nodes in ad-hoc networks usually have limited processing capabilities, and resources should be used optimally because some nodes may not have enough processing power and will have to rely on the processing power of other nodes, as it is done in all peer-to-peer networks.

According to the present invention, clustering is used for setting up ad-hoc networks for multi-party conferencing, because it enables scalability and does not require centralized control. A signalling User Agent (also called herein UA) is a functional entity of the present invention and resides in each peer (also called herein terminal). At any given time, it acts as either a cluster member (having a functional user agent) or a super member (having a functional super user agent). At any given time, there is also only one super member in a cluster of members and all the members are connected to it. Super members are also interconnected among each other having direct links with super members of neighbouring clusters. According to the present invention, for carrying on a multi-party conference in an ad-hoc network, clusters are dynamically created and deleted. As members join or leave the conference, clusters can split and merge during the given multi-party conference. The key parameters used for carrying out the invention are parameters including a Split value (Sv), and a Merge Value (Mv), which are defined for each cluster of terminals. If the number of terminals in a cluster reaches Sv, such as when new terminals join the conference, the cluster is split in two. If it reaches Mv, such as when terminals leave the conference, the cluster merges with another cluster of the same conference.

Reference is now made to FIG. 1, which is an exemplary high-level representation of an ad-hoc network 100 formed to handle a multi-party conference using terminal clusters 102, 104, and 106 according to the preferred embodiment of the present invention. Each such cluster comprises one or more terminals, which act as members or super members. Only one super member resides in each cluster. In the present example, terminals A 112, C 114, and B 122 are the super members of the three respective clusters 102, 104, and 106, and therefore have signaling links 130 established therebetween. Each member of the clusters has signaling links 132 established with its direct super member. As mentioned, each member or super member comprises either a user agent or a super user agent.

According to the present invention, a super member may be elected when a new cluster is created, when a super-member leaves the cluster, or when two clusters merge or split. The member who is elected is preferably the member with the most resources (e.g. processing power/memory), although it is contemplated that other considerations may be used as well, such as for example the belonging to a same network operator, etc. Super members keep track of members' resources, or of any other criteria used for the super member election. This allows them to designate a new super member when they leave a multi-party conference or when the cluster splits. A super member keeps track as well of the level of resources of the super-member of each neighbouring cluster. This aids in the selection of a new super-member when two clusters merge. The first cluster is created when the first two participants to the multi-party conference are connected and the super member is then elected. The last cluster is deleted when the last participant leaves the conference.

New members may be added to a cluster. When multiple clusters are present in the same conference, the super member then propagates the information to the other super members. When a member leaves, it terminates its connection with the super member and the super member propagates the information to the other super members. If it is a super member, it will also designate its replacement before leaving, following the super member election procedure.

When a new member is added to the cluster, the super member of the cluster initiates the split procedure if the size of the cluster reaches Sv, the split value. The super member remains super member of the new cluster in which it ends, and a new super member is elected for the other cluster.

If the size of the cluster reaches the merge value Mv when a member leaves, the super member of the cluster initiates a merge procedure. It consists of searching for a new cluster with which to merge, with the constraint that the size resulting from the merging should be less than Sv, the split value. A super member is elected as soon as the merging is done.

Figure 2:
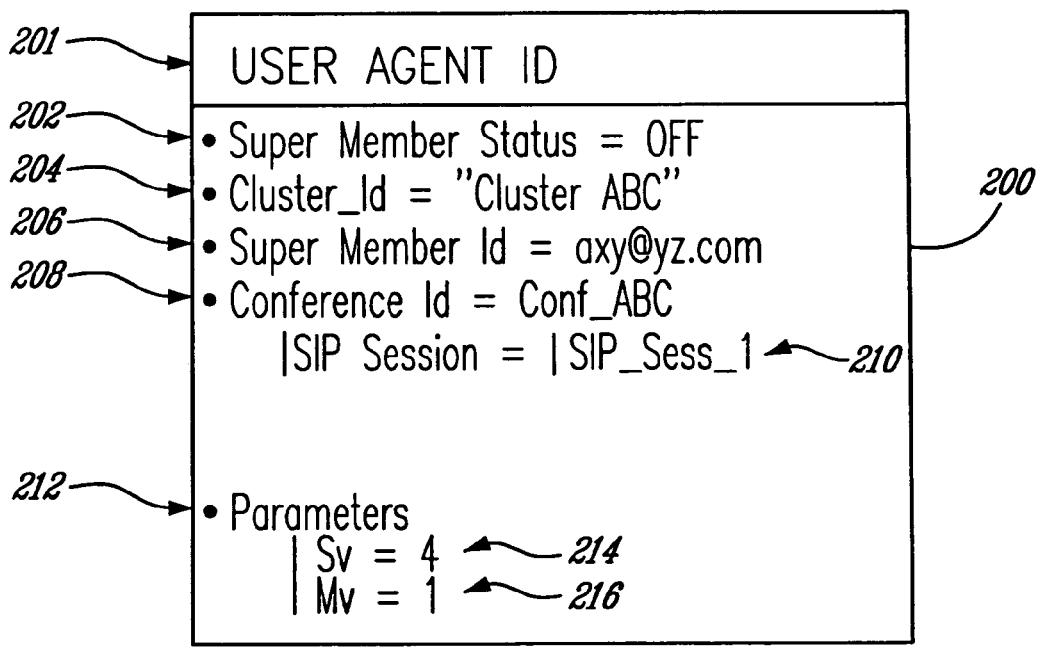
FIG. 2 is an exemplary high-level representation of a user agent employed for handling a multi-party conference using terminals clusters according to the preferred embodiment of the present invention.

Reference is now made to FIG. 2, which is an exemplary high-level representation of a user agent employed for handling a multi-party conference using terminals clusters according to the preferred embodiment of the present invention. Such a user agent 200 may be implemented in a given terminal using software and/or hardware modules, or any combination thereof. It comprises a user agent identification 201, and an indication 202 of its status, i.e. if it acts either as a member or a super member. In the case the user agent 200 functions as a regular member, it further comprises the identity 204 of the cluster it is part of, and the identity 206 of its corresponding super member, which manages the cluster. In addition, it includes the identity 208 of the multi-party conference to which it participates, which may include the identity 210 of the communication session it establishes with the corresponding super member of the cluster. Finally, the user agent 200 comprises the cluster parameters 212 indicating the split value Sv 214 and the merge value Mv 216 of the cluster. Typically, the parameters 212 remain constant throughout the duration of a given multi-party conference, while other information stored in the user agent may be changed as members join or leave the conference, as it will described hereinafter in further details.

Figure 3:
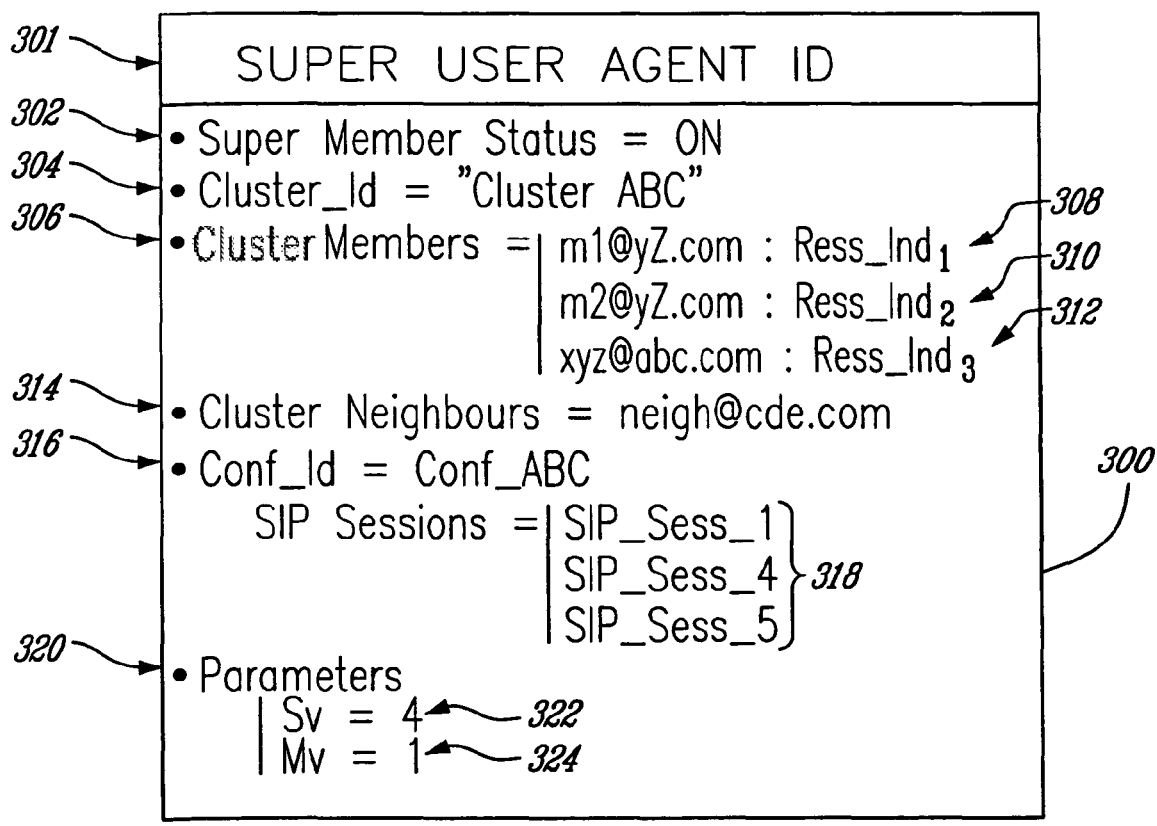
FIG. 3 is an exemplary high-level representation of a super user agent employed for handling a multi-party conference using terminals clusters according to the preferred embodiment of the present invention.

Reference is now made to FIG. 3, which is an exemplary high-level representation of a super user agent employed for handling a multi-party conference using terminals clusters according to the preferred embodiment of the present invention. Such a super user agent 300 may also be implemented in a given terminal using software and/or hardware modules, or any suitable combination thereof. It comprises a super user agent identification 301, and an indication 302 of its super member status, i.e. it acts as a super member for the cluster it is part of. The super user agent 300 further comprises an identity 304 of the cluster it manages, and a cluster members' list 306 that comprises identities 308, 310, and 312 of the other members of the cluster. Furthermore, the super user agent 300 comprises a cluster neighbors list 314 that identifies the neighbors of the cluster, i.e. the other super members that participate to the same multi-party conference, in case such other super members exist within that same conference. Finally, the agent 300 comprises the identity 316 of the multi-party conference to which it participates, which may include the identities 318 of each individual sessions it establishes with super members of list 314 and with other members 308-312 of its cluster, and parameters 320 indicating the split value Sv 322 and the merge value Mv 324 of the cluster. Typically, the parameters 320 remain constant throughout the extent of a given conference, while the other information may be changed as members join or leave the conference, as it will described hereinafter in further details.

The present invention may be implemented advantageously using various signalling protocols. In the presently described exemplary preferred embodiment of the invention, the IETF's Session Initiation Protocol (SIP) is used for illustrating a possible implementation of the invention, because SIP is lightweight and extensible. Possible extensions to SIP may also be contemplated for the implementation of the invention. For example, a new SIP parameter called "Clustering" may be included in the SIP "Supported" header field to indicate that multi-party conferencing using clusters is supported by the sender of the message.

In the following exemplary implementation of the invention, the functional SIP entity used for carrying out the invention is the user agent (also called herein UA) and the super user agent (also called herein SUA). UA maps onto a cluster member, while a SUA maps onto super member. At any given time a UA or SUA is in only one cluster. This cluster has a unique identifier and also a set of parameters, as described with reference to FIGS. 2 and 3. UA and SUA store the cluster id, the parameters, but also the super member id. In addition the SUA store the list of members and neighbours. A conference is also uniquely identified and is made of a set of dialogs and clusters.

Figure 4:
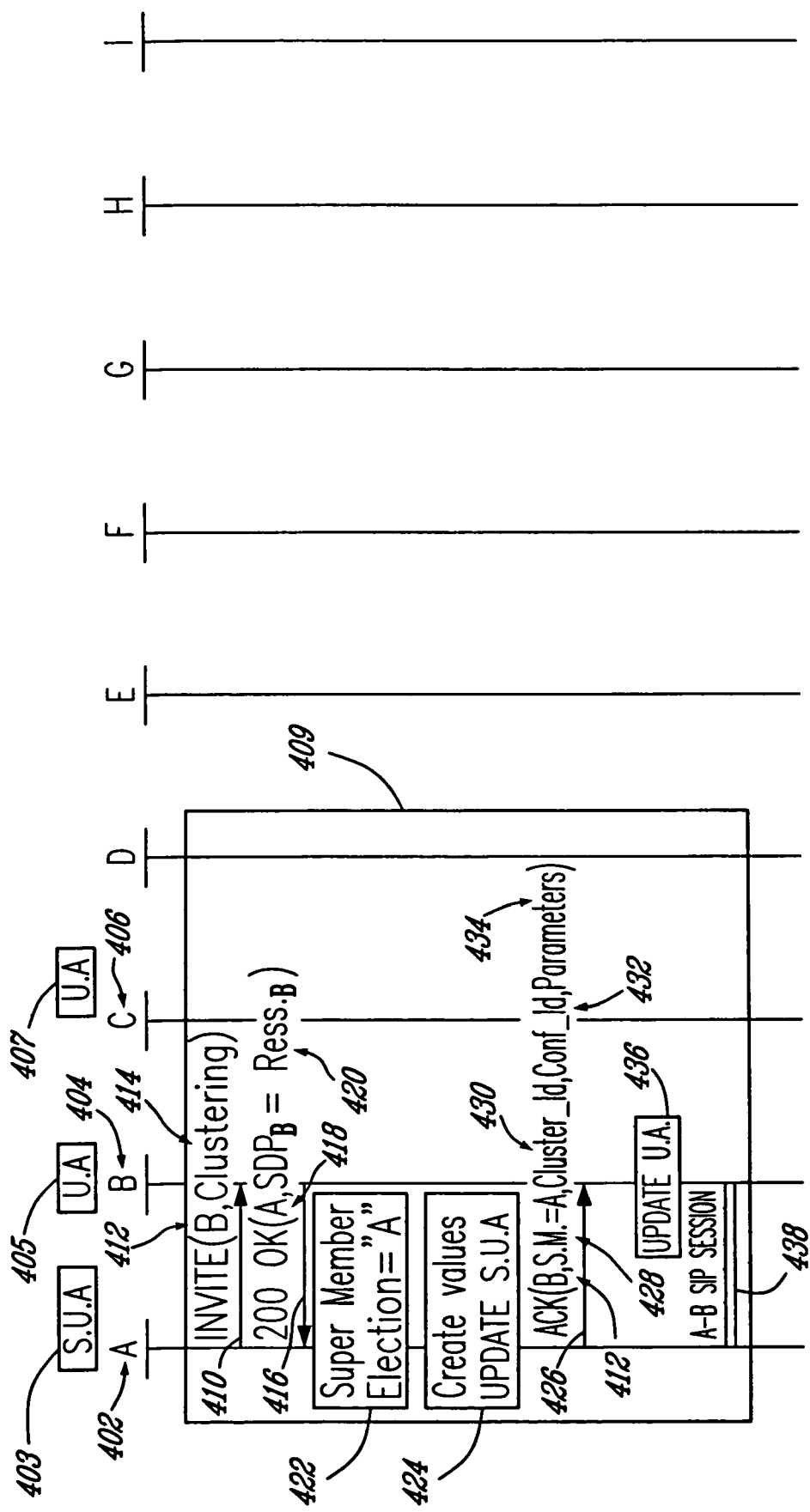
FIG. 4 is an exemplary high-level nodal operation and signal flow diagram representing a terminals cluster creation according to the preferred embodiment of the present invention.
Figure 4:
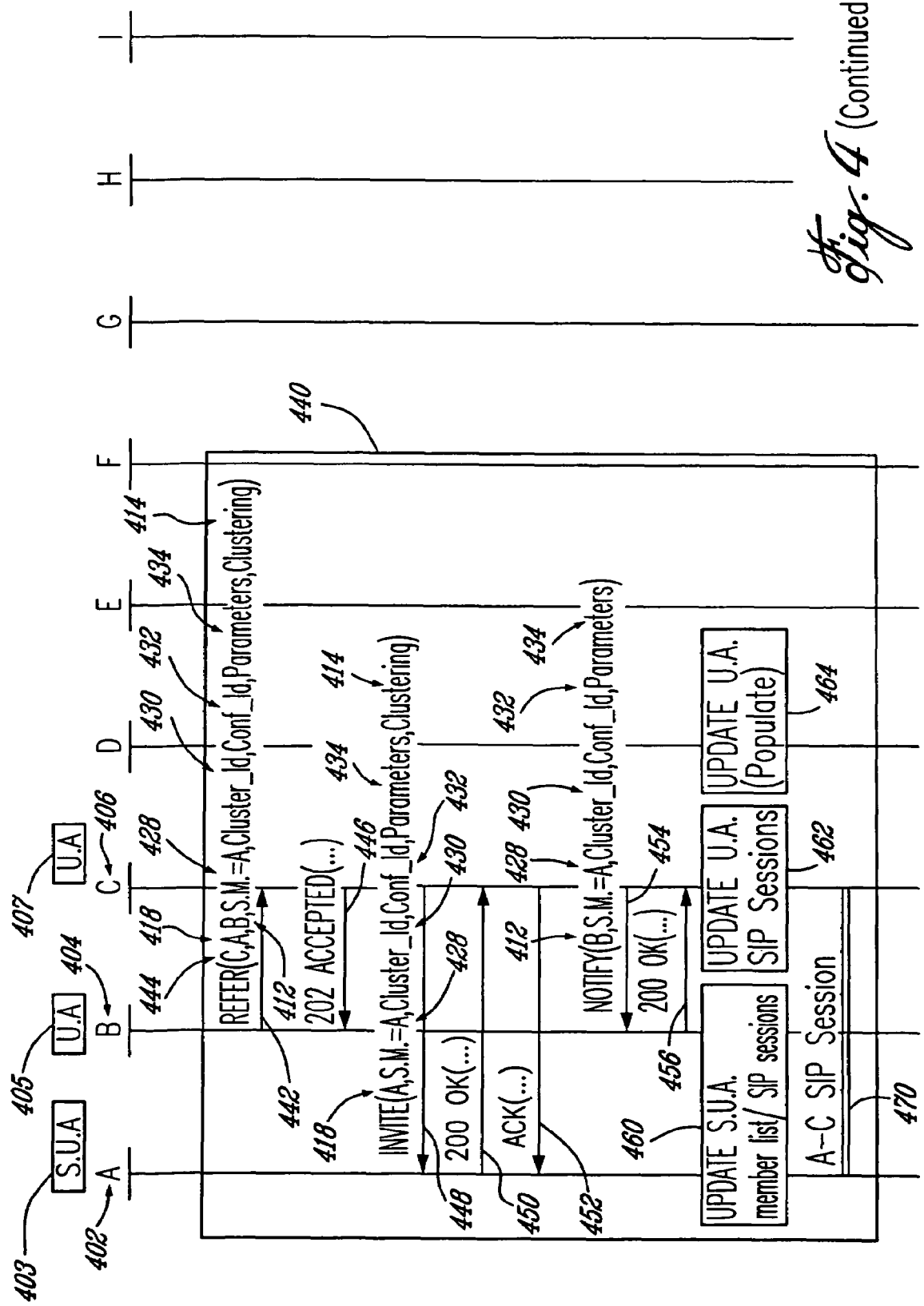

Reference is now made to FIG. 4, which is an exemplary high-level nodal operation and signal flow diagram representing a terminal cluster creation using SIP according to the preferred embodiment of the present invention. Shown in FIG. 4 are a plurality of possible participants to a multi-party conference identified A through I, all of which are SIP capable terminals, among which are terminals A 402, B 404, and C 407. First, FIG. 4 shows the establishment 409 of a SIP session between terminal A 402 and B 404 for carrying on a conference. For this purpose, the SIP-based terminal A sends a SIP INVITE message 410 comprising the destination identity 412, i.e. an identity of the terminal B which is invited to the conference, and a clustering indication 414 that specifies to terminal B that terminal A 402 supports conference clustering according to the present invention. Assuming that terminal B also supports clustering, it responds back with a 200 OK message 416 that includes a message destination identity 418, i.e. the identity of terminal A, and, for example, extended $SDP_B$ (Session Description Protocol) parameters 420 indicative of the resources (e.g. processing power and/or memory) of terminal B 404. In action 422, the terminal A elects a cluster super member, using for example a comparison between its own resources and the ones of terminal B received in message 416, to elect the terminal with the most resources. In action 422, terminal A elects itself to act a super member for the new cluster to be formed. In action 424, terminal A 402 creates or activates its own super user agent module 403 and populates it with the values relative to the new cluster. With reference being jointly made to FIG. 4 and FIG. 3, terminal A may populate its super user agent 403 with the values described in relation with FIG. 3, i.e. set the super user status 302 to ON, assign a cluster id 304, update the member list 306 with the identity of terminal B, set to NULL the neighbours list 314 since no current super member neighbour exists, assign a conference id 316 for the new session to be established with terminal B, and create parameters 320, such as for example set the split value Sv to four (4) and the merge value Mv to one (1). Then, terminal A 402 sends a SIP ACK message 426 to terminal B to confirm the new setup of the cluster, the message 426 including the message destination 412, the indication 428 that the current super member is set as being terminal A, the cluster id 430, the conference id 432, and the parameters 434 (Sv and Mv). Upon receipt of message 426, the terminal B 404 may create or activate its own user agent 405 and may populate it with the values received in message 426, action 436. Finally, a SIP session 438 is created between the terminal A 402 and terminal B 404, which is the first SIP session of the multi-party conference.

FIG. 4 continues with the addition of a new participant, terminal C 406, to the same conference, action 440. For this purpose, terminal B 404 may send a SIP REFER message 442 to terminal C 406 to invite the later to join the same multi-party conference, the message 442 including the destination of the message, terminal C id 444, the identities of the existing participants to the conference, i.e. terminal A and terminal B identities 418 and 412, the indication 428 that the current cluster super member is set as being terminal A, the cluster id 430, the conference id 432, the parameters 434 (Sv and Mv), and the indication 434 that clustering is supported. Assuming that terminal C also supports clustering, it responds back to terminal B with a SIP 202 ACCEPTED message 446, and then sends a new INVITE message 448 to terminal A in order to establish a new SIP session with that terminal for carrying on the multi-party conference, which message may comprise parameter values analogous to the ones described in relation to message 442. Terminal A responds to terminal C with a SIP 200 OK message 450, which receipt by terminal C is confirmed by a SIP ACK message 452 sent back from terminal C to terminal A. Likewise, terminal C 406 also sends a SIP NOTIFY message 454 for informing terminal B of its acceptance to join the conference, wherein the message 454 may comprise parameters values analogous to the ones described hereinbefore. In actions 460 and 462, terminals A and B update the super user agent 403 and user agent 405 respectively with the addition of terminal C identity on the member list (for the super user agent 403) and the addition of the respective SIP session with terminal C (for both the super user agent 403 and the user agent 405). In action 464, terminal C creates or activates its own user agent module 407 and populates it with the proper values related to the cluster and conference in a manner analogous to the one described hereinbefore for the user agent 405. Finally, the new SIP session 470 between terminal A and terminal C is created.

At this point, terminals A, B, and C participate to the multi-party conference, are all members of the same cluster where terminal A acts as a super member. SIP sessions are established between terminal A and terminal B, and between terminal A and terminal C.

Figure 5:
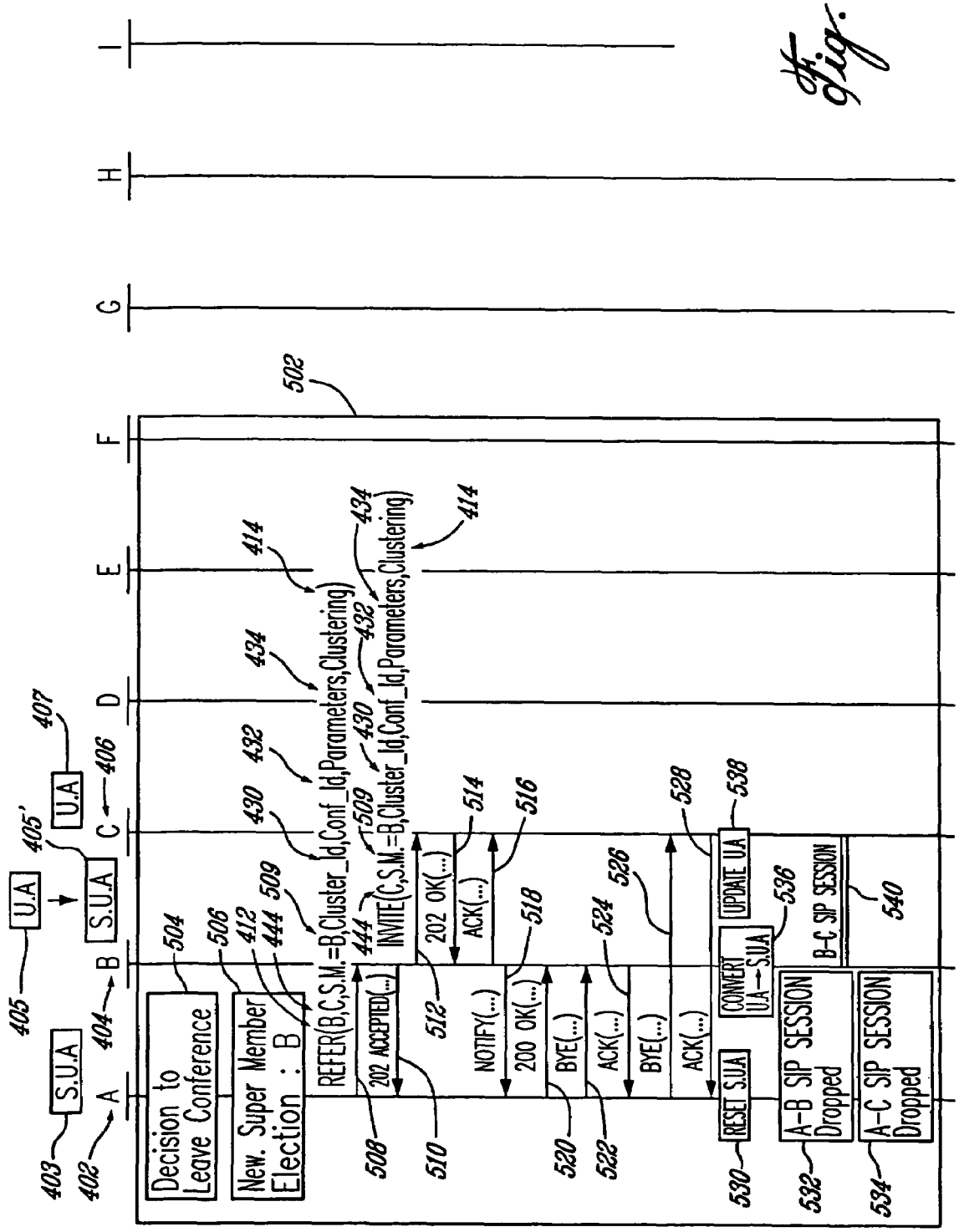
FIG. 5 is an exemplary high-level nodal operation and signal flow diagram representing a terminals cluster update according to the preferred embodiment of the present invention.

Reference is now made to FIG. 5, which is an exemplary high-level nodal operation and signal flow diagram representing a terminal cluster update according to the preferred embodiment of the present invention, related to the removal 502 of terminal A 402 from the multi-party conference described in relation to FIG. 3. In action 504, it is assumed that terminal A 402 decides to leave the ongoing multi-party conference. In action 506, since terminal A is about to leave the conference, it first elects a new super member for the cluster, which in the present case is assumed to be terminal B 404. In action 508, terminal A 402 sends a SIP REFER message 508 to terminal B 404 for informing the later of the election of a new super member for the cluster, the message 508 comprising the destination identity, i.e. the identity 412 of the terminal B, the indication 509 that the newly elected super member is terminal B, the cluster id 430, the conference id 432, the parameters 434 of the cluster, and the clustering indication 414. Terminal B 404 receives the SIP REFER message 508 and responds back to terminal A with a SIP 202 ACCEPTED message 510 that indicates the acceptance of terminal B to act as the new super member of the cluster. Then, terminal B sends to the other terminal involved in the cluster, i.e. to terminal C 406, an INVITE message 512 with information similar to the one of message 508, which indicates to terminal C the new super member terminal B. The former receives message 512 and responds back with a 200 OK message 514, which receipt by terminal B is confirmed by the SIP ACK message 516. Terminal B then uses a NOTIFY message 518 to signal to terminal A the completion of the terminal C update performed in actions 512-516, and receives back a confirmation via the 200 OK message 520. At this point, terminal A 402 sends a SIP BYE message 522 to terminal B to cancel is the SIP session 438 that was previously established between terminals A and B. Terminal B 404 confirms receipt of message 522 with a 200 OK message 524 sent to terminal A. Terminal A 402 also sends a BYE message 526 to terminal C to also cancel the SIP session 470 that was previously established between terminals A and C. Terminal C 406 confirms receipt of the message 526 with a 200 OK message 528 sent to terminal A.

In action 530, because terminal A 402 has left the cluster and the conference, the super user agent 403 is reset or deactivated by terminal A. In action 536, terminal B 404 that is elected as super member coverts its user agent 405 into a super user agent 405', and updates the super user agent 405' with the current information relative to the cluster, as shown in FIG. 3. Finally, in action 538, the terminal C 406 also updates its user agent 407 with the proper information, as better shown in FIG. 2, and in particular its super member identification to reflect that the current super member is no longer terminal A, but rather terminal B.

The SIP sessions 438 and 470 are dropped in actions 532 and 534, while a new SIP session 540 is established between the terminal B, which now acts a cluster super member, and the terminal C 406, which continues to act as a regular member.

Figure 6:
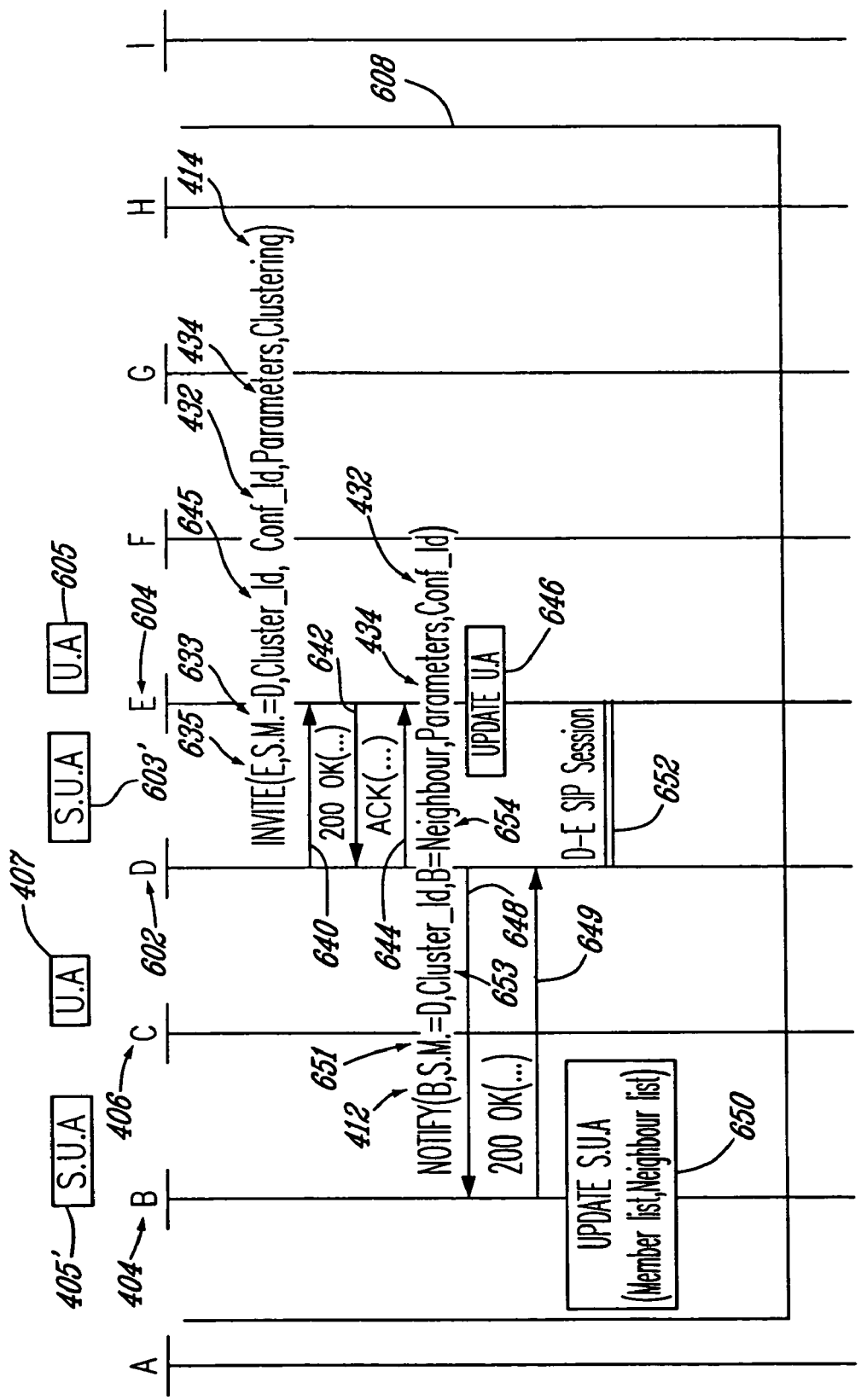
FIG. 6 is an exemplary high-level nodal operation and signal flow diagram representing a terminals cluster split according to the preferred embodiment of the present invention.

Reference is now made to FIG. 6, which is an exemplary high-level nodal operation and signal flow diagram representing a terminals cluster split operation according to the preferred embodiment of the present invention. The split operation 608 of FIG. 6 follows the events previously described in relation to FIGS. 4 and 5. In action 610, terminals B and D also establish a new SIP session 612 therebetween in a manner analogous to the none described hereinbefore with reference, for example, to action 440, so that at this point, terminals B, C, and D form one cluster where terminal B acts as the cluster's super member. Further, terminal B invites yet another participant, i.e. terminal E 604, to the same multi-party conference, by sending an INVITE message 614, the message comprising the identity of the destination, i.e. of the terminal E 604, an indication 509 that terminal B acts as the cluster super member, the cluster id 430, the conference id 432, the cluster parameters 434, and the clustering indication 414. Terminal E positively responds to the invitation with a 200 OK message 616, which receipt by terminal B is confirmed by the SIP ACK message 618. In action 620, terminal B updates its super user agent 405' with the addition of a new cluster member, i.e. terminal E 604. In action 622, terminal B 404 detects that with the addition of terminal E to its cluster member list, the split value Sv has reached its limit value of four (4) members, so in action 624 a decision to split the current cluster is taken. In action 626, terminal B 404 elects the split candidates, i.e. the members which are to be assigned to a new cluster, as being the terminals D 602 and E 604, and in action 628 it elects terminal D 602 as the super member of the new, yet to be formed, cluster. Action 628 may comprise an election based on the resources of terminals D and E, or any other criteria consideration, including a random selection of terminal D.

Terminal B 404 then informs terminal D 602 elected as the new super member of the split decision, by sending a REFER message 630 containing the destination terminal D 631, an indication 633 that terminal D is to act as a cluster super member, the identity 635 of the other member assigned to the new cluster, i.e. of terminal E 604, the cluster id 637 set to NULL that indicates that a new cluster ID is to be elected by the terminal D for the new cluster to be formed, the conference id 432, and cluster parameters 434 (which ma also be skipped in a variant of the invention). Upon receipt of message 630, terminal D 602 chooses a new identity for the new cluster, action 632, stores the cluster parameters 434, action 634, in its super user agent 603' (or in the variant of the invention creates new parameters), finalizes the update of the super user agent 603', action 636, and responds back to the terminal B 404 with a 202 ACCEPTED message 638, which may carry parameter values analogous to the ones described for message 630, and particularly the identity of the new cluster chosen in action 632 by terminal D.

As terminal D acts as a super member for the new cluster, it must invite the other cluster member, i.e. terminal E 604 into a new SIP session. For this purpose, it sends an INVITE message 640 to terminal E 604, the message comprising a destination terminal E identity 635, the indication 633 that terminal D acts as the cluster super member, the cluster id 645, the conference id 432, the cluster parameters 434, and the clustering indication 414. Terminal E 604 receives the invitation to join the new SIP session with terminal D 602, and responds positively with a 200 OK message 642, which receipt by terminal D is confirmed by the ACK message 644. Terminal E 604 then creates or activates its user agent 605 and updates the agent with the proper information for the cluster received in message 640, action 646. Terminal D 602 acting as the super member of the new cluster, which contains terminals D 602 and E 604, then notifies its neighbor terminal B 404, bases on a super member to super member relationship, via a SIP NOTIFY message 648 that it has accomplished the merge request and it becomes a super member. The message 648 contains the destination identity 412 of terminal B, the indication 651 that terminal D 602 is to act as a super member of the new cluster, a cluster id 653, an indication 654 that terminal B 404 is considered to be a neighbor, the cluster parameters 434 and conference id 432. In action 650, the terminal B 404 updates its super user agent 405' with the newly available information received from message 648, and in particular updates its cluster member list by removing identities of terminals D 602 and E 604, because these terminals are no longer part of its cluster, and by the addition of the identity of terminal D that acts as a cluster super member on its neighboring list.

Finally, the new SIP session 652 is established between terminals D 602 and E 604. At this point, super member terminals B 404 and D 602 have the SIP session 612 established therebetween (they each act as super members of their respective 20 cluster), terminal B 404 and terminal C 406 also has the SIP session 540 established therebetween, while terminal D 602 has the SIP session 652 established with terminal E 604.

Figure 7:
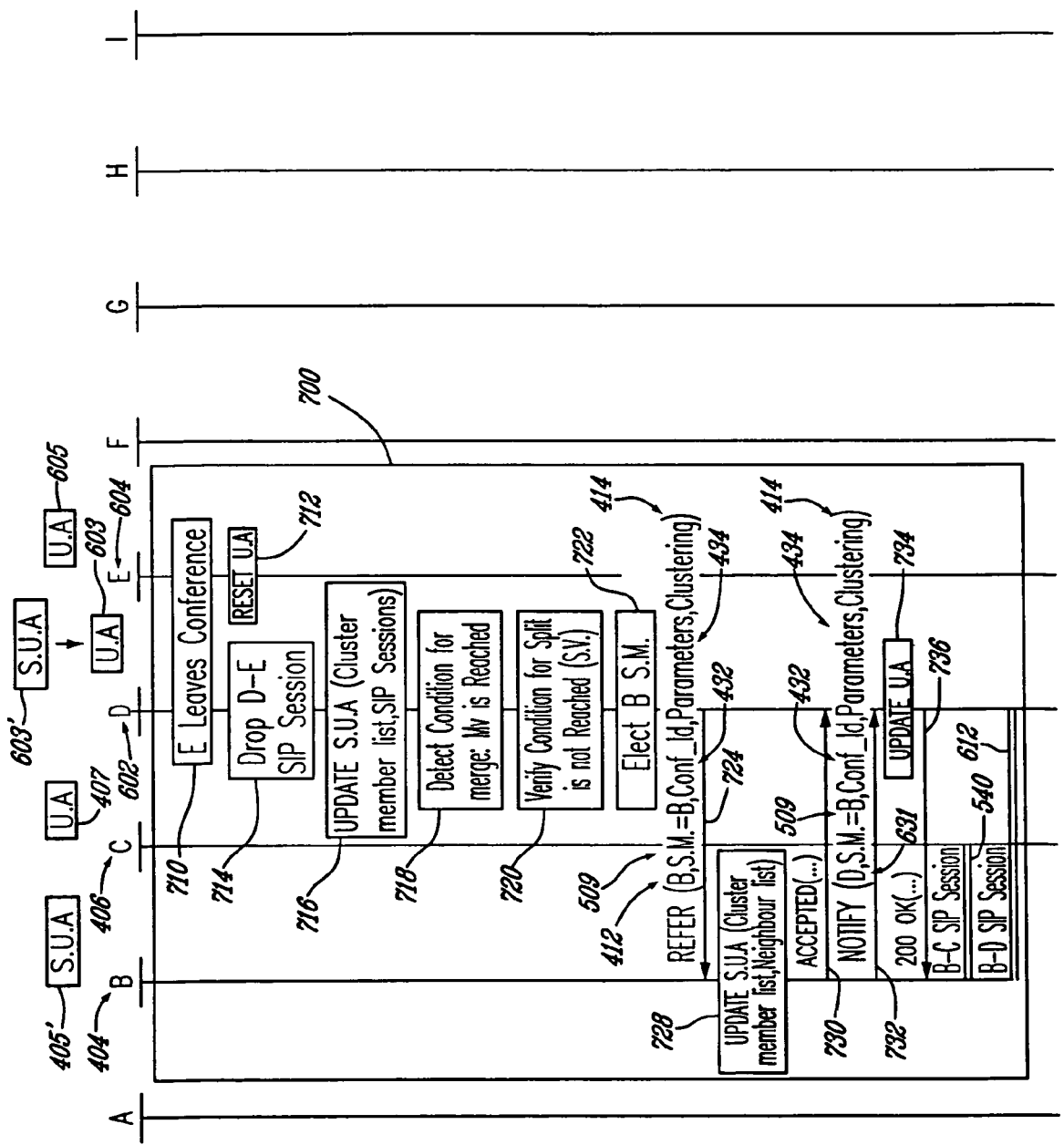
FIG. 7 is an exemplary high-level nodal operation and signal flow diagram representing a terminals cluster merge according to the preferred embodiment of the present invention.

Reference is now made to FIG. 7, which is an exemplary high-level nodal operation and signal flow diagram representing a terminals cluster merge according to the preferred embodiment of the present invention. FIG. 7 may be seen as a continuation of the previously described FIGS. 4-6. Thus, when the actions of FIG. 7 start, super member terminals B 404 and D 602 have the SIP session 612 established therebetween, terminal B 404 also has the SIP session 540 established with terminal D 602, while terminal D 602 has the SIP session 652 established with terminal E 604.

The cluster merge operation 700 described in FIG. 7 starts with the decision of terminal E 604 to leave the ongoing multi-party conference, action 710. In action 714, the SIP session 652 between terminals E 604 and D 602 is dropped, and in action 712, terminal E 604 resets its user agent 605 since it left the conference as well as 10 its cluster. Likewise, terminal D 602 also updates its super user agent 603' by removing reference to the cluster member terminal E 604 and to the SIP session 652 that has just been terminated. In action 718, terminal D 602 detects a condition for merge with another cluster, since with the removal of terminal E 604 from the cluster the merge value Mv has been reached, i.e. the only current member of the cluster is terminal D so the number of current members of the cluster has reached one (1), which is the Mv. In action 720, terminal D 602 further checks if the split value Sv would not be reached if a merge is actually performed with its neighbor cluster. Part of action 720 may be detecting that the neighboring cluster comprises only two (2) terminals, i.e. terminals B 404 and C 406, and detecting that with the addition of the merging candidate terminal D 603, the total number of cluster members will be three (3), which is less than the split value Sv set to four (4). In action 722, terminal D elects terminal B 404 as its new super member, and sends to that terminal a REFER message 724 informing terminal B of its desire to join the cluster for which terminal B is the super member. Message 724 may comprise a destination identity, i.e. terminal B id 412, and indication 509 that terminal B is to act as a super member, the conference id 432, the parameters 434 (that may be the same as the ones already stored in the super user agent 405'), and possibly the clustering indication 414. Terminal B 404 receives message 724, and updates its super user agent 405' with the received information, in particular by adding terminal D identity to its cluster member list, while removing that identity from its cluster neighbor list. Terminal B 404 then responds back to terminal D with a SIP ACCEPTED message 730 confirming the change, and then uses a SIP NOTIFY message 732 that instructs terminal D to also update its current super user agent 603' with the proper information. For this purpose, the message 732 comprises, among other analogous parameter values, the indication 509 to the effects that terminal B 404 is to act as a cluster super member for terminal D 602, which thus becomes a regular member of the cluster. In action 734 terminal D 602 converts its super user agent 603' into a user agent 603, which it updates with the proper information relative to the cluster. Following the update 734, terminal D 602 confirms the update to terminal B 404 using a SIP 200 OK message 736.

At this point, part of the ongoing multi-party conference, SIP sessions 540 and 612 are carried on between super member terminal B 404 and terminal C 406 on one side, and between super member terminal B 404 and terminal D 602 on the other side, and the only existing cluster comprises all terminals B 404, C 406, and D 602.

The multi-party conference may continue until at least two terminals carry on one SIP session therebetween. When the last two parties leave the conference, all SIP sessions are dropped and the respective user agents or super user agents are reset (actions not shown).

Therefore, with the present invention it becomes possible to carry on flexible and scalable multi-party conferences in ad-hoc networks, without the need of a centralized infrastructure.

Based upon the foregoing, it should now be apparent to those of ordinary skills in the art that the present invention provides an advantageous solution, which offers the possibility of establishing multi-party conferences in ad-hoc networks. Although the system and method of the present invention have been described in particular reference to certain radio telecommunications messaging standards like SIP, it should be realized upon reference hereto that the innovative teachings contained herein are not necessarily limited thereto and may be implemented advantageously with other applicable radio telecommunications standards and protocols. It is believed that the operation and construction of the present invention will be apparent from the foregoing description.

While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cluster of terminals for carrying a cluster-based conference, the cluster comprising:
a super member terminal equipped with a super user agent which includes:
a cluster member list including identities of terminals that are members of the cluster;
a conference identity that identifies the conference to which the super member terminal participates;
a cluster neighbour list that identifies any other one or more other super member terminals of other clusters which also participate in the conference;
cluster parameters associated with the cluster including a split value Sv indicative of a maximum number of terminals that may be part of the cluster, wherein when the split value Sv is reached during the conference, the cluster is split, and a merge value Mv indicative of a minimum number of terminals that may be part of the cluster, wherein when the merge value Mv is reached during the conference, the cluster is merged with another cluster; and
one or more member terminals;
wherein for carrying on the cluster-based conference, communications sessions are established i) between the super member terminal and each one of the one or more member terminals, and ii) between the super member and each any other one or more other super member terminals.

2. The cluster of terminals claimed in claim 1, wherein each of the one or more members include a user agent comprising:
an identity of the super member terminal of the cluster;
the conference identity; and
the cluster parameters.

3. The cluster of terminals claimed in claim 1, wherein the super user agent further includes a cluster identification that uniquely identifies the cluster.

4. The cluster of terminals claimed in claim 2, wherein the user agent comprises a cluster identification that uniquely identifies the cluster.

5. The cluster of terminals claimed in claim 1, wherein the conference identity comprises an identity of communication sessions established by the super member terminal with the one or more member terminals.

6. The cluster of terminals claimed in claim 5, wherein the communication sessions are Session Initiation Protocol (SIP) sessions.

7. The cluster of terminals claimed in claim 1, wherein the super user agent further comprises an indication that the super member terminal acts as a super member of the cluster.

8. An ad-hoc network of terminals comprising:
a first cluster of terminals involved in a multi-party conference;
a second cluster of terminals involved in the multi-party conference;

wherein each one of the first and second cluster comprises:
- a super member terminal equipped with a super user agent which includes:
  - a cluster member list including identities of terminals that are members of the cluster;
  - a conference identity that identifies the conference to which the super member terminal participates;
  - a cluster neighbour list that identifies any other one or more other super member terminals of other clusters which also participate in the conference;
  - cluster parameters associated with the cluster including a split value Sv indicative of a maximum number of terminals that may be part of the cluster, wherein when the split value Sv is reached during the conference, the cluster is split, and a merge value Mv indicative of a minimum number of terminals that may be part of the cluster, wherein when the merge value Mv is reached during the conference, the cluster is merged with another cluster; and
- one or more member terminals;

wherein for carrying on the cluster-based conference, communications sessions are established i) between the super member terminal of each cluster and each one of the one or more member terminals of the same cluster, and ii) between the super members of each one of the first and second clusters.

9. The ad-hoc network claimed in claim 8, wherein each of the one or more members include a user agent comprising:
- an identity of an associated super member terminal;
- the conference identity; and
- cluster parameters.

10. The ad-hoc network claimed in claim 8, wherein the super user agent further includes a cluster identification that uniquely identifies the cluster.

11. The ad-hoc network claimed in claim 9, wherein the user agent further includes a cluster identification that uniquely identifies the cluster.

12. The ad-hoc network claimed in claim 8, wherein the conference identity comprises identities of communication sessions established by the super member terminal with the one or more member terminals.

13. The ad-hoc network claimed in claim 12, wherein the communication sessions are Session Initiation Protocol (SIP) sessions.

14. The ad-hoc network claimed in claim 8, wherein the super user agents of the first and second clusters further comprise indication that they act as super members of their respective cluster.

* * * * *

UNITED STATES PATENT AND TRADEMARK OFFICE
CERTIFICATE OF CORRECTION

| | | |
|---|---|---|
| PATENT NO. | : 7,697,490 B2 | Page 1 of 1 |
| APPLICATION NO. | : 10/999944 | |
| DATED | : April 13, 2010 | |
| INVENTOR(S) | : Dssouli et al. | |

It is certified that error appears in the above-identified patent and that said Letters Patent is hereby corrected as shown below:

In Fig. 6, Sheet 6 of 8, for Tag "610", delete "SiP" and insert -- SIP --, therefor.

In Fig. 6, Sheet 6 of 8, for Tag "612", delete "SiP" and insert -- SIP --, therefor.

In Fig. 6, Sheet 6 of 8, for Tag "432", delete "Conf. Id," and insert -- Conf_Id, --, therefor.

In Fig. 6, Sheet 6 of 8, for Tag "622", delete "S.V.=4" and insert -- Sv=4 --, therefor.

In Fig. 7, Sheet 8 of 8, for Tag "720", in Line 2, delete "(S.V)" and insert -- (Sv) --, therefor.

In Column 9, Line 1, after "to cancel" delete "is".

In Column 10, Line 45, after "respective" delete "20".

In Column 10, Line 64, after "as well as" delete "10".

Signed and Sealed this

Twenty-seventh Day of July, 2010

David J. Kappos
*Director of the United States Patent and Trademark Office*